(12) United States Patent
Peretz et al.

(10) Patent No.: US 9,639,430 B2
(45) Date of Patent: May 2, 2017

(54) INTERMEDIATE DATA BACKUP IN AN INCREMENTAL SNAPSHOT DATA BACKUP SYSTEM TO REDUCE DATA BACKUP TIME

(71) Applicant: GLOBALFOUNDRIES Inc., Grand Cayman (KY)

(72) Inventors: Ofer Peretz, Haifa (IL); Michael Sternberg, Haifa (IL); Asaf Yeger, Kiryat-Tivon (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 204 days.

(21) Appl. No.: 13/966,712

(22) Filed: Aug. 14, 2013

(65) Prior Publication Data

US 2015/0052320 A1    Feb. 19, 2015

(51) Int. Cl.
*G06F 11/14*    (2006.01)

(52) U.S. Cl.
CPC ...... *G06F 11/1461* (2013.01); *G06F 11/1451* (2013.01)

(58) Field of Classification Search
CPC ........................ G06F 11/1461; G06F 11/1451
See application file for complete search history.

(56) References Cited

U.S. PATENT DOCUMENTS

| | | | | |
|---|---|---|---|---|
| 7,287,086 B2 * | 10/2007 | Krissell | | 709/232 |
| 8,990,162 B1 * | 3/2015 | Kushwah | | G06F 11/1469 707/646 |
| 2009/0307283 A1 | 12/2009 | Lehr et al. | | |
| 2010/0281216 A1 * | 11/2010 | Patel et al. | | 711/118 |
| 2012/0254117 A1 * | 10/2012 | Kishi et al. | | 707/640 |

* cited by examiner

*Primary Examiner* — Reginald Bragdon
*Assistant Examiner* — Edward Wang
(74) *Attorney, Agent, or Firm* — Michael LeStrange; Andrew M. Calderon; Roberts Mlotkowski Safran Cole & Calderon, P.C.

(57) ABSTRACT

Machines, systems and methods for performing intermediate data backups, the method comprising monitoring data updates to one or more data blocks in at least a target data storage medium, wherein the target data storage medium is subject to an incremental data backup routine at prescheduled time intervals; in response to determining that said at least one or more data blocks is updated prior to a prescheduled time interval for the incremental data backup routine, performing one or more intermediate data backups to store data from the updated data blocks to at least one backup data storage medium; and in response to determining that said at least one or more data blocks is updated prior to the prescheduled time interval for the incremental data backup routine but after the last of the intermediate data backups, copying data on one or more updated data blocks after the last of the intermediate data backups to the backup data storage medium.

12 Claims, 4 Drawing Sheets

INTERMEDIATE DATA BACKUP IN AN INCREMENTAL SNAPSHOT DATA BACKUP SYSTEM TO REDUCE DATA BACKUP TIME

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to incremental data backup using block level snapshots of a data volume, and reducing the time window associated with the backup process.

BACKGROUND

A data volume may be backed up by way of copying the data blocks (e.g., 512-byte blocks) in the data volume. This process, commonly referred to as block level backup, is in contrast to file level backup which is performed by copying data files as units, as opposed to copying data blocks as units. Block level backup may be performed at regular time intervals. For example, a data volume may be backed up every day at 12 midnight.

Once a data volume is fully backed up, during future backup attempts, the back up process may be applied only to those blocks of data that have been changed or updated since the last backup process, thus skipping over the data blocks that have remained unchanged. To keep track of the updated data blocks, a data structure such as a bitmap or a data array may be utilized, where a Boolean bit is used to flag the data blocks according to a data block's update status.

In a simple example, if a data volume includes 10 blocks, then a 10-bit array may be used, where bits F1 through F10 are associated with blocks B1 through B10, respectively. After a full backup, all bits are set to a first value (e.g., 0) indicating that all blocks have been backed up. If a block B3, for example, is updated between time T1 (when the previous backup was performed) and time T2 (when the next backup is performed), then a bit F3 associated with the updated block B3 is set to a second value (e.g., 1) to indicate that B3 needs to be backed up at time T2.

Accordingly, time-specific snapshots of a data volume may be created at time intervals T1, T2 and so on. A snapshot of a data volume at time T2 represents the state of the data stored on the volume at the time T2. For that reason, at the time T2, the data blocks in a target data volume are locked at time T2 so that the data blocks cannot be updated while the snapshot is taken. As such, applications that are attempting to write to the data blocks in a target data volume may experience a delay in performing the write operations until the snapshot process is completed.

In some implementations, instead of delaying the write process, the update data (i.e., new data) that is to be written to a locked data block is stored in a queue implemented in volatile memory or on non-volatile memory (e.g. a disk drive). Data stored in the queue is written to the target data block after the lock is released. The above implementation is associated with substantial overhead because, as mentioned, it requires for the update data to be held in a queue pending a write back to the target data block.

If the queue is implemented in main memory, the system may run out of memory if a large volume of the data being written to the locked data blocks during the snapshot process. If the queue is implemented on the disk drive, a heavy burden may be placed on the system due to the overhead associated with having to track the location of the update data that is stored on disk, reading the update data from disk, and storing the update data in the target data blocks after the snapshot process has ended.

Once the snapshot process ends, a snapshot of the target volume SNT2 is maintained (e.g., a snapshot of the target volume containing blocks B1 to B10 is retained at the time (e.g., T2) when the snapshot was taken). It is noteworthy that if a large number of data blocks have been updated since the time of the last backup (e.g., at time T1), the snapshot process (e.g., at time T2) may take a relatively long time. A faster and more efficient data backup system is desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for performing intermediate data backups are provided. In accordance with one embodiment, the method comprises monitoring data updates to one or more data blocks in at least a target data storage medium, wherein the target data storage medium is subject to an incremental data backup routine at prescheduled time intervals; in response to determining that said at least one or more data blocks is updated prior to a prescheduled time interval for the incremental data backup routine, performing one or more intermediate data backups to store data from the updated data blocks to at least one backup data storage medium; and in response to determining that said at least one or more data blocks is updated prior to the prescheduled time interval for the incremental data backup routine but after the last of the intermediate data backups, copying data on one or more updated data blocks after the last of the intermediate data backups to the backup data storage medium.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
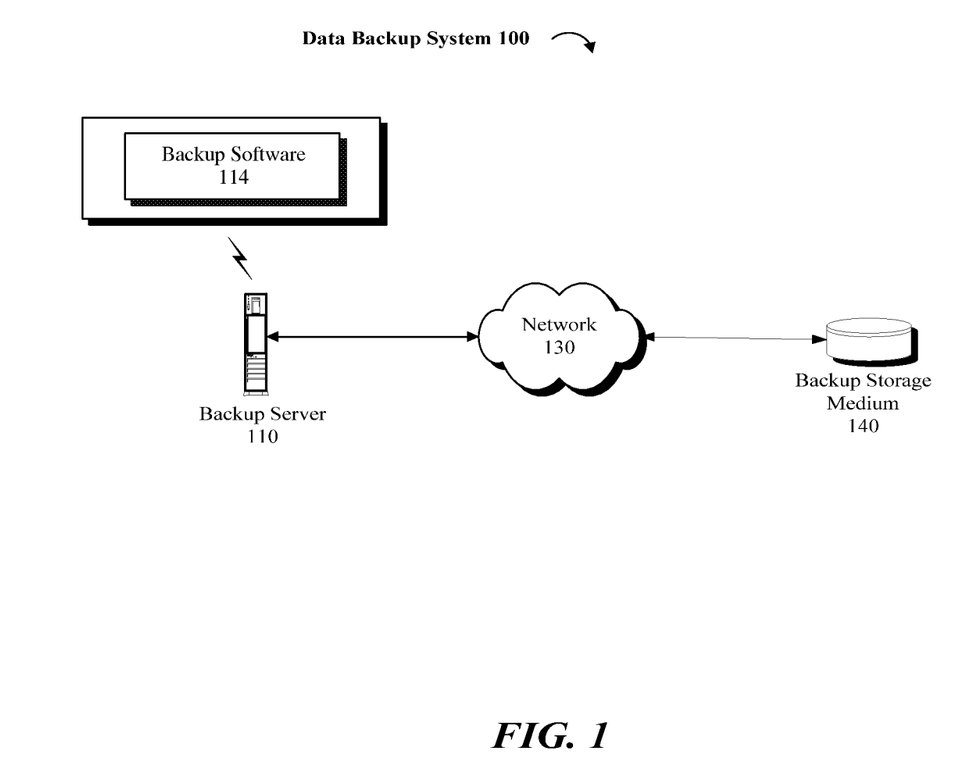
FIG. 1 illustrates an exemplary computing environment in accordance with one or more embodiments, wherein a data backup system is implemented to perform incremental data backups.

Referring to FIG. 1, a block level data backup system 100 may be implemented in a network 130 in which one or more updated data blocks are copied to a backup storage medium 140 sometime prior to the time the next regularly scheduled snapshot is scheduled by way of backup software 114 running on a backup server 110. At the time the next snapshot is to take place, if the earlier copied updated data blocks remain the same, then the earlier copied updated data blocks are not copied again, reducing the load on the backup system 100 during the next snapshot or backup process. In the following, the terms backup and snapshot may be used interchangeably.

Figure 2:
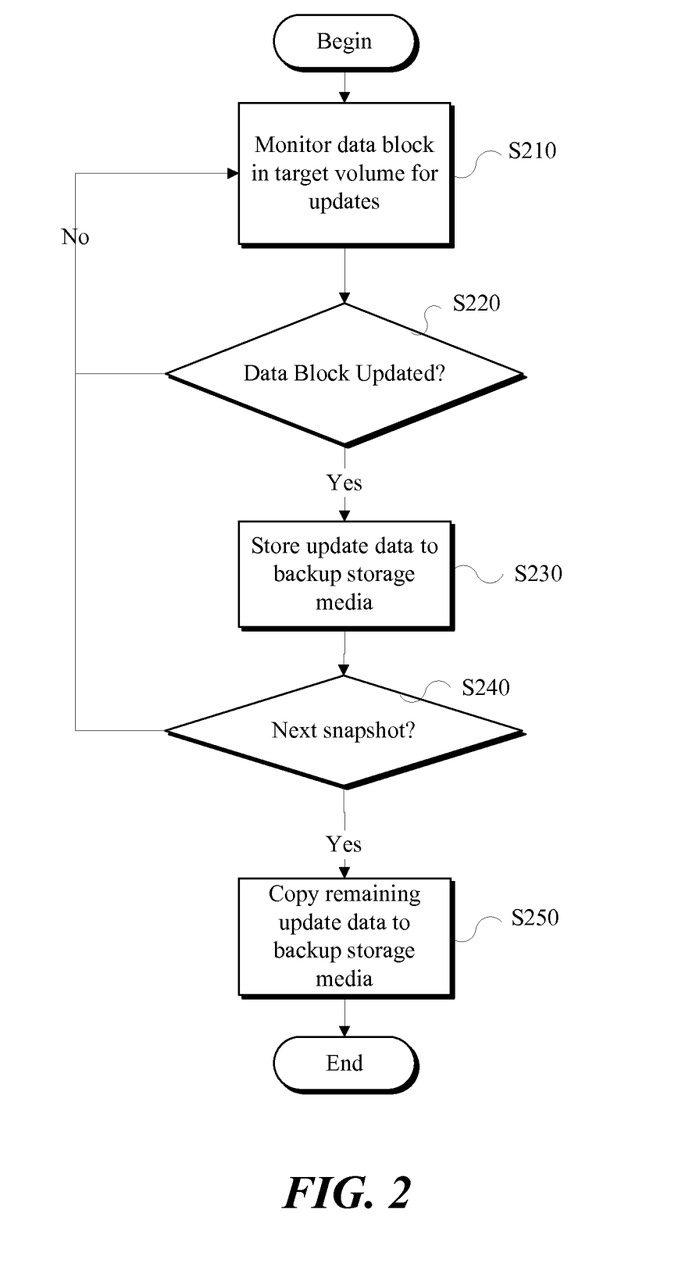
FIG. 2 is a flow diagram of an exemplary method for performing intermediate backups in advance of prescheduled incremental data backups, in accordance with one embodiment.

Referring to FIG. 2, to implement the above scheme, after a backup of a target volume is performed (e.g., at time T1), data blocks in the target volume are monitored to determine if a data block is updated (S210). If a data block is updated (S220), then a copy of data stored in the updated data block is optionally forwarded to a backup server 110 and is stored in one or more backup data storage media 140 (S230). At the time scheduled for the next snapshot (e.g., at time T2) (S240), any remaining updated data blocks (i.e., data blocks that have been updated since T1, but have not been copied to the backup media) are copied to the backup data storage media 140 (S250). In this manner, a snapshot for the target data volume at time T2 may be generated.

To be efficient, the above snapshot backup scheme, instead of copying an updated data block in real time, may delay the copying of the updated data block until a predetermined time interval has expired. Accordingly, rather than making an immediate copy of the updated data block in real time, as soon as the data block is updated, several data blocks that have been updated during the predetermined time interval are selected and copied to the backup media, prior to the time scheduled for the next backup snapshot (e.g., at time T2).

For example, for a target data volume with data blocks B1 through B10, data block B2 may be updated at T1+1 and T1+5, B5 may be updated at T1+3, and B7 may be updated at T1+2, where T1 represent the time of the previous backup or snapshot. Assuming that the next snapshot is schedule at time T2, depending on implementation, after a predetermined time interval (e.g., T1+N), one or more data blocks in the target data volume that have been updated since T1 are selected and are copied to the backup media. This process may be repeated at other time intervals (e.g., T1+kN). Desirably, in the above example, the value of T1+kN is smaller than T2, meaning that the intermediate backup episodes take place prior to the next regularly scheduled backup time T2.

In the above implementation, advantageously, the updated data blocks are accumulated and the updated data is copied to the backup media (e.g., by way of a background process) in a frequency that may be adjusted according to the availability of the system's resources (e.g., processing availability and capability) and available communication bandwidth (e.g., network traffic) as provided in further detail below. It is appreciated that according to the above implementation, a snapshot of the target data volume is created at time T2, after the last set of updated data blocks have been copied to the backup media, for example, post execution of the last of several intermediate backup episodes.

It is also noteworthy that in one implementation, not all data blocks that are updated prior to the time T2 will be copied to the backup media during an intermediate backup episode. In other words, in one embodiment, certain (but not all) updated data blocks may be selected for the purpose of copying to the backup medium. The selection may be either at random or according to predetermined criteria. A random selection process may or may not be efficient depending on system implementation and the nature of data being processed.

For the purpose of introducing potential additional efficiency into the backup process disclosed above, instead of a random selection, the updated data blocks may be optionally selected according to certain factors. For example, the selection may be based the probability that the selected data is among the least frequently updated, prior to the next scheduled snapshot process. As another example, data blocks may be selected for copying where the copying (of the data that is stored in the selected updated data blocks) would consume the least amount of resources.

With respect to the former example scenario, heuristic- or statistics-based methods may be utilized to determine or at least estimate, with a certain degree of confidence, which of the updated data blocks in a target data volume may be least likely updated until the backup or snapshot period at time T2 is encountered. In this manner, updated data blocks that would otherwise be copied to the backup media at time T2 are copied in advance (i.e., during an intermediate backup episodes at times T1+kN<T2). The selected updated data blocks, that are not updated after the last of the intermediate backup episodes, will not be copied to the backup media at time T2, thereby reducing the load on the backup system at time T2.

In one implementation, it may be hypothesized or determined that the selection of the most recently updated (MRU)

blocks may provide a mechanism for determining which updated data blocks are to be copied to backup media during an intermediate backup episode. To track the MRU blocks, a data block in the target volume may be associated with an entry in a tracking data structure (e.g., a bitmap, a table, an array, a linked list, etc.), wherein the entry provides an indication of the last time the corresponding data block was updated. For example, an entry E7 in the tracking data structure may indicate that data block B7 was updated at a certain time. The entry may thus include a flag (e.g., a Boolean indicator) that is set to a first value (e.g., 1) and optionally also a time TB7, to indicate when B7 was updated.

The above process may be applied to some or all of the data blocks in a target data volume. As such, after time T1, when a data block in the target data volume is updated, the corresponding entry for that data block in the tracking data structure is updated with a time stamp associated with the time the respective data block was updated. Utilizing the information stored in the tracking data structure, during an intermediate backup period, one or more updated data blocks are selected such that the selected data blocks have a timestamp that is within X time units (e.g., 5 minutes) from the time of the intermediate backup episode taking place. The selected update data blocks define the MRU blocks and are then copied to the backup media and the flag associated with the copied data blocks is reset to a second value (e.g., 0) to indicate that the copying has been successful.

Accordingly, a number of updated data blocks may be selected at each intermediate backup episode to be copied to the backup media to relieve the load on the backup system during a scheduled snapshot backup event. In the implementation noted above, the selection criteria used is advantageously more efficient than a random selection scheme, because updated data stored in data blocks that have been most recently updated may not be updated again until the next scheduled snapshot. Depending on implementation, instead of selecting the MRU blocks, the least frequently updated (LFU) blocks may be selected based on an assumption that data blocks that are least frequently updated will likely not be updated until the next scheduled snapshot. Alternatively, if it is presumed or determined that the least recently updated (LRU) blocks are less likely to be updated prior to the next scheduled snapshot, then the LRU blocks may be selected.

The criteria noted about with respect to selecting LFU, LRU or MRU blocks may be based on statistical analysis of the update trends in a particular storage system and may be adapted or changed in real time. That is, if statistical analysis shows that the trend is more favorable towards LFU blocks, then the LFU blocks may be selected and if the trend changes to be more favorable toward MRU blocks then the MRU blocks are selected for backup. Depending on implementation, the selection of the updated data blocks or copying of the updated data to the backup media may be scheduled during a time where the resources available in the subject computing environment are idle or in recognition and consideration to the rate at which resources are available or capable of performing the related task and also in view of the available data communication bandwidth that may be available for transferring the backup data to a backup system or to backup media.

In the following, examples are provided to further elaborate on the concepts disclosed above. It is noted, however, that the specific examples and details in such examples should not be construed as limiting the scope of the claimed subject matter to the particular details. That said, let's assume that a target volume D is to be backed up according to the above process and that volume D contains block 1 through 10. After an incremental backup has taken place, it may be determined that blocks 2, 3 and 9 are to be sent to the backup server 110. If during the incremental backup, a new I/O write occurs to block 9 and block 9 has not yet been sent to the backup server 110, then the new I/O write is added to a queue (i.e., is cached) for block 9. Block 9 is then read and the data read from block 9 is sent to the backup server 110. Thereafter, the new I/O is written to block 9.

In another example, let's assume that volume E that is to be backed up includes 200,000 blocks and that every second 100 new I/O writes are performed on volume E. For a write to volume E, an incremental bitmap may be used to update the number of the blocks that were updated and the time associated with the update. It is noteworthy that the data stored in the block may not be stored in memory, in one implementation, but the metadata which includes a reference to the block where the data is saved is stored in memory. This implementation avoids any data loss that may be caused as the result of a power failure which would wipeout any data stored in volatile memory.

In one example, every X minutes, the information of the blocks that were updated according to the data in the incremental bitmap is used to determine the blocks that have been updated since the last scheduled snapshot or the last incremental backup. Based on said information and according to a selection criteria (e.g., the LRU blocks), it is determined which blocks are to be sent to the backup server. For example, at time T (not during a backup process), an LRU algorithm may be executed on the incremental bitmap and to generate an output referring to blocks 201-230, 244, and 301-450. Depending on implementation, a subgroup of the above blocks (e.g., 100 blocks) may be selected for intermediate backup. In one embodiment, the first 100 blocks may be selected from the entire list that includes blocks 201-230, 244, 301-450. The 100 blocks that are selected may thus include blocks 201-230, 244, 301-369.

Backup software 114 may thus read the selected blocks from the target data volume and send the selected blocks to the backup server 110. Depending on implementation, the list may be optimized and instead of the first 100 blocks, the biggest group of blocks that are sequential may be selected such that a faster read may be achieved from the disk. Thus, in the above example, instead of reading the noted 100 blocks including 201-230, 244, 301-369, blocks 201-230 and 301-370 may be read. New writes are not added to the queue, if there is no backup process taking place. The list of blocks may be selected from the incremental bitmap or may be chosen at random or based on other methods as disclosed earlier.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
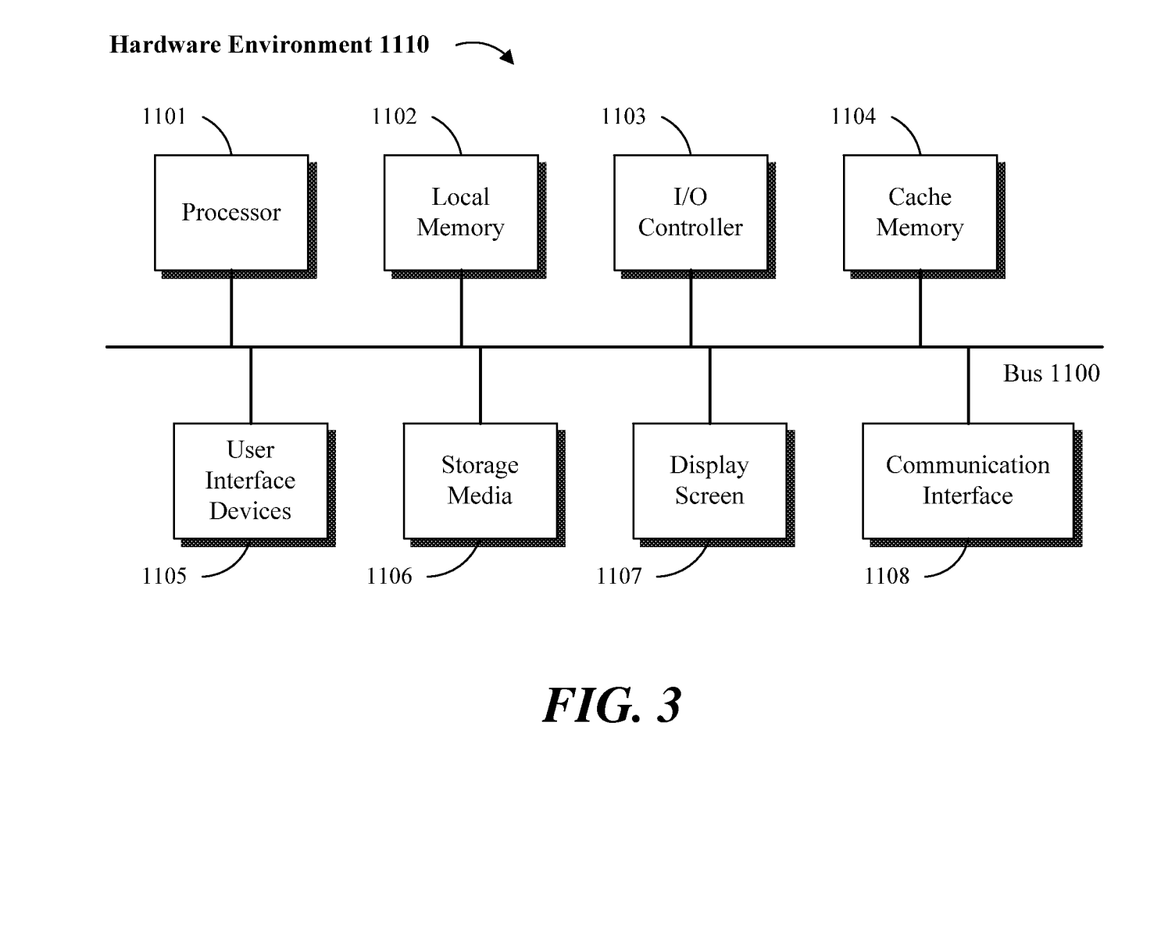
FIGS. 3 and 4 are block diagrams of hardware and software environments in which the disclosed systems and methods may operate, in accordance with one or more embodiments.
Figure 4:
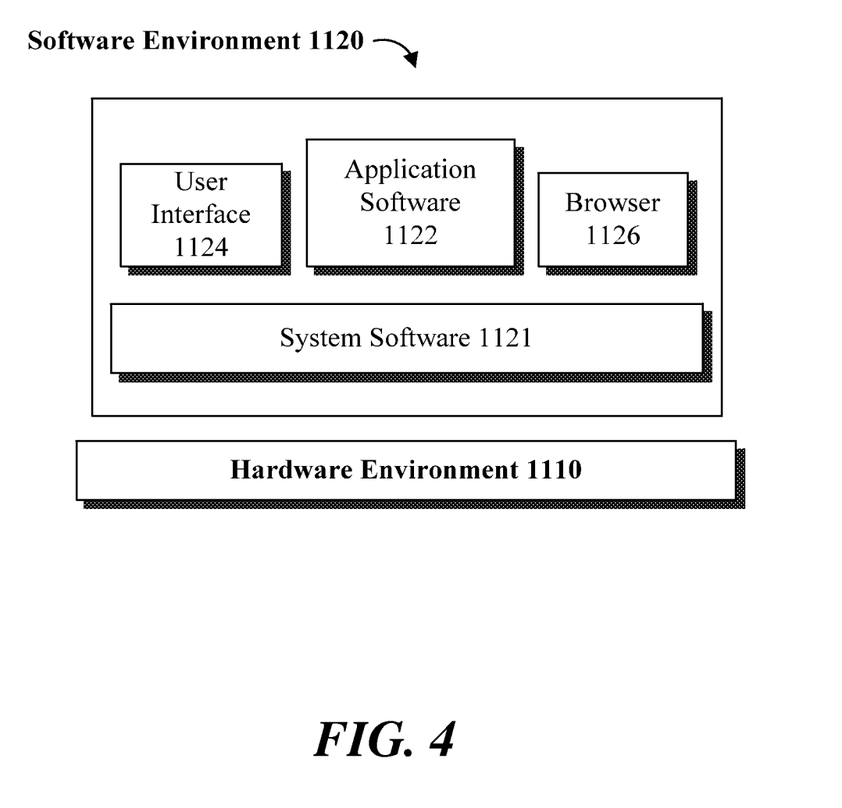

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for performing intermediate data backups, the method comprising:

monitoring data updates to one or more data blocks in at least a target data storage medium, wherein the target data storage medium is subject to an incremental data backup routine at prescheduled time intervals;

in response to determining that said one or more data blocks is first updated prior to a prescheduled time interval for the incremental data backup routine, performing one or more intermediate data backups to store data from the one or more first updated data blocks to at least one backup data storage medium; and in response to determining that said one or more data blocks is secondly updated prior to the prescheduled time interval for the incremental data backup routine but after the last of the intermediate data backups, copying data from the one or more secondly updated data blocks after the last of the intermediate data backups to the backup data storage medium, wherein the one or more data blocks receive a time stamp when updated that indicates a time associated with the intermediate data backups and the one or more intermediate data backups occur in view of an availability of a communication bandwidth related to network traffic, the one or more intermediate data backups store data from a selected group of the one or more first updated data blocks, and the selected group of the one or more first updated data blocks are selected randomly and comprise less than all of the one or more first updated data blocks.

2. The method of claim 1, wherein the selected group of the one or more first updated data blocks are selected based on criteria that is used to select one or more data blocks from among the one or more first updated data blocks that are least likely to be updated again prior to a next prescheduled incremental backup routine.

3. The method of claim 2, wherein the criteria comprises selecting the one or more first updated data blocks that are most recently updated (MRU).

4. The method of claim 2, wherein the criteria comprises selecting the one or more first updated data blocks that are least frequently updated (LFU).

5. The method of claim 2, wherein the criteria is determined based on statistical analysis of data captured as the result of monitoring update activity on a plurality of the data blocks on the target data storage medium.

6. The method of claim 2, wherein the criteria is determined based on heuristics.

7. The method of claim 2, wherein the selection approach under said criteria is modified in real time based on statistical analysis which indicates that probably using a first selection criteria at a time T1 is more efficient than using a second selection criteria.

8. A system for performing intermediate data backups, the system comprising:

a processor; and memory communicatively coupled to the processor, wherein the memory is encoded with instructions, and wherein the instructions when executed on the processor comprise:

monitoring data updates to one or more data blocks in at least a target data storage medium, wherein the target data storage medium is subject to an incremental data backup routine at prescheduled time intervals;

performing one or more intermediate data backups to store data from one or more first updated data blocks to at least one backup data storage medium, in response to determining that said one or more data blocks is first updated prior to a prescheduled time interval for the incremental data backup routine, and copying data from one or more secondly updated data blocks after the last of the intermediate data backups to the backup data storage medium, in response to determining that said one or more data blocks is secondly updated prior to the prescheduled time interval for the incremental data backup routine but after the last of the intermediate data backups, wherein the one or more data blocks receive a time stamp when updated that indicates a time associated with the intermediate data backups and the one or more secondly updated data blocks represent a biggest group of data blocks that are sequential, the one or more intermediate data backups store data from a selected group of the one or more first updated data blocks, the selected group of the one or more first updated data blocks are selected based on criteria that is used to select one or more data blocks from among the one or more first updated data blocks that are least likely to be updated again prior to a next prescheduled incremental backup routine, and the criteria comprises selecting the one or more first updated data blocks that are most recently updated (MRU), and metadata associated with the one or more data blocks includes a reference to a block where data is saved, with the metadata stored in the memory while the one or more data blocks are not stored in the memory.

9. The system of claim 8, wherein the criteria comprises selecting the one or more first updated data blocks that are least recently updated (LRU).

10. A computer program product comprising a non-transitory computer readable storage medium having a computer readable program, wherein the computer readable program when executed on a computer causes the computer to:

monitor data updates to data blocks in at least a target data storage medium, wherein the target data storage medium is subject to an incremental data backup routine at prescheduled time intervals;

in response to determining that said blocks are first updated prior to a prescheduled time interval for the incremental data backup routine, perform one or more intermediate data backups to store data from a subgroup of the first updated data blocks to at least one backup data storage medium; and in response to determining that said data blocks are secondly updated prior to the prescheduled time interval for the incremental data backup routine but after the last of the intermediate data backups, copy data from a subgroup of the secondly updated data blocks after the last of the intermediate data backups to the backup data storage medium, wherein the data blocks receive a time stamp when updated that indicates a time associated with the intermediate data backups, with the one or more intermediate data backups occurring in view of an availability of a communication bandwidth related to network traffic and the secondly updated data blocks represent a biggest group of data blocks that are sequential, the criteria comprises selecting the first updated data blocks that are least recently updated (LRU), and an incremental bitmap is used to update a number of blocks that were updated and a time associated with the update, and at a time T new writes are not added to a queue, with T representing a time in which no backup occurs including the incremental data backup routine and the one or more intermediate backups, wherein an LRU algorithm is executed on the incremental bitmap at the time T to generate an output referring to the one or more first updated data blocks that are LRU, and metadata associated with the one or more data blocks includes a reference to a block where data is saved, with the metadata stored in the memory while the one or more data blocks are not stored in the memory.

11. The computer program product of claim 10, wherein the one or more intermediate data backups store data from a selected group of the first updated data blocks.

12. The computer program product of claim 10, wherein the criteria comprises selecting the first updated data blocks that are most recently updated (MRU).

* * * * *